June 21, 1927.
D. M. BATESON
1,633,512
SNUBBER HOOK AND QUICK FASTENER LINK
Filed Jan. 21, 1926
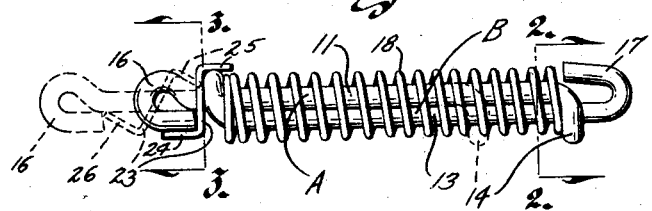
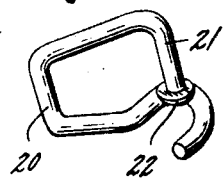
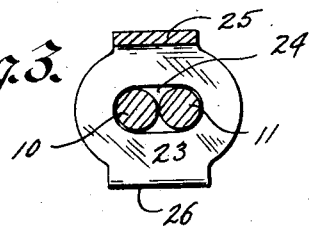
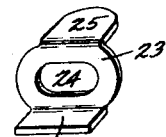
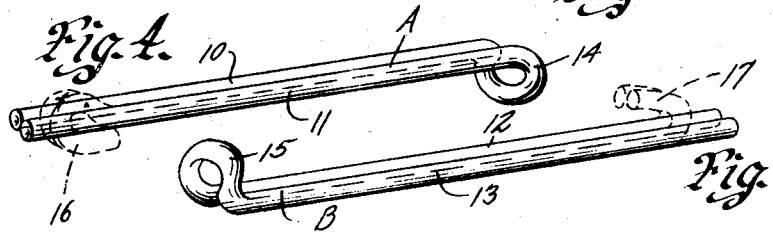
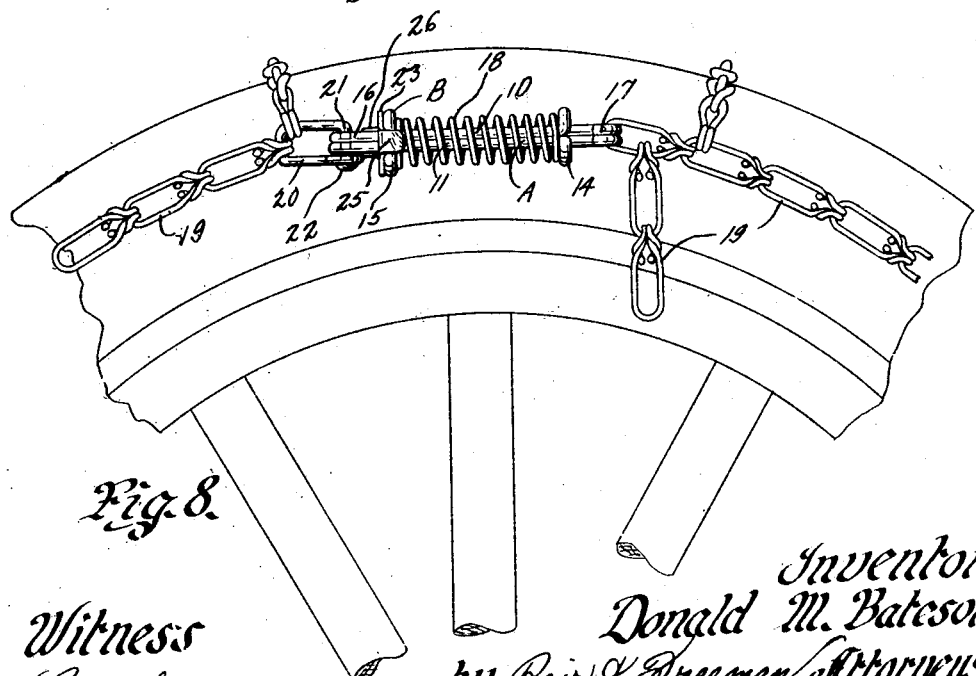
Witness
Ray Rucker
Inventor
Donald M. Bateson
by Bair & Freeman Attorneys Patented June 21, 1927.

1,633,512

UNITED STATES PATENT OFFICE.

DONALD M. BATESON, OF MARSHALLTOWN, IOWA.

SNUBBER HOOK AND QUICK-FASTENER LINK.

Application filed January 21, 1926. Serial No. 82,743.

The object of my invention is to provide a snubber hook fastener and quick attachment link for non-skid chains of simple, durable and inexpensive construction.

More particularly, it is my purpose to provide a device of the kind under consideration having members formed of bent wire to provide at one end of each member a loop slidably mounted on the other member and at the other end of each of said members a hook, said members having a spring mounted on their intermediate portions.

Another purpose of my invention is to provide a device as described in which said spring forms the closure member for the open hook at one end of one of the members.

Still a further object of my invention is to provide such a device having a quick attachment link of novel structure by which my device can be quickly and easily assembled on a non-skid tire chain without spreading a cross chain.

An additional purpose of my invention is to provide on the slidably connected members a simple and inexpensive stop washer, which can be readily and easily manipulated for moving it to position for holding the device extended, and which will readily and automatically release upon a slight further extension of the device.

With these and other objects in view, my invention consists in the construction, arrangement and combination of the various parts of my snubber hook and quick fastener link, whereby the objects contemplated are attained, as hereinafter more fully set forth, pointed out in my claims, and illustrated in the accompanying drawings, in which:

Figure 1 shows a side elevation of a snubber hook and quick fastener link embodying my invention.

Figure 2 is a detail, sectional view taken on the line 2—2 of Figure 1.

Figure 3 is a similar view taken on the line 3—3 of Figure 1.

Figure 4 is a perspective view of one of the link members.

Figure 5 is a perspective view of another of said members.

Figure 6 is a perspective view of the stop washer forming a part of my device.

Figure 7 is a perspective view of the quick attachment link for fastening my device to a non-skid chain; and Figure 8 is a side elevation of the portion of a wheel and pneumatic tire thereon having a non-skid chain mounted on the tire provided with my improved snubber hook and quick fastener device.

My improved device comprises a pair of wire members. These are illustrated in side elevation in Figure 4 and are indicated generally there by the reference characters A and B.

Each of the members A and B consists of a stout wire bent to form two parallel members indicated in the accompanying drawings in the case of the member A by the reference characters 10 and 11 and in the case of the member B by the reference characters 12 and 13.

At one end of the member A is secured an offset loop 14 adapted to slidably receive the members 12 and 13.

At the opposite end of the member B is an oppositely offset loop 15 adapted to slidably receive the members 10 and 11.

The member A has at one end a hook 16 formed by bending the members 10 and 11, and this hook may be closed, if desired, to form an eye.

The member B has its members 12 and 13 at its end opposite its loop 15 bent to form the hook 17, comprised of the curled over ends of the wire portions 12 and 13.

In Figures 1 and 8, the members A and B are shown assembled together.

Mounted on them between the loops 14 and 15 is a coil spring 18, which engages the respective loops 14 and 15, and holds the device normally in its collapsed position under tension.

For fastening one end of my device to a non-skid chain 19, I have provided the quick attaching link 20, having at one end the shank 21 with the head 22. The shank 21 is extended through the hook or eye 16 and the other end of the link may then be bent around the shank 21 adjacent to the head 22.

It will, of course, be understood that the proper links of the chain 19 are received in the link 20, as shown for example in Figure 8.

As will be observed from Figure 1, the loop 14 and the hook 17 are offset in opposite directions from the central, longitudinal axis of the device. Thus the loop 14 serves to partially close the open end of the hook 17 and the spring 18 is a movable closure member for that hook.

I provide in connection with my device a stop washer of novel construction, which is shown in Figures 1 and 2, and in perspective in Figure 6.

This stop washer comprises a plate member 23 having an elongated slot 24 formed therein. This plate 23 is mounted on the elements 10 and 11 of the member A between the loop 15 of the member B and the hook or eye 16.

The plate 23 has at its opposite edges the oppositely inclined extensions 25 and 26.

The plate 23 and the extension 26 cover the ends of the wire member which form the hook 16 when the parts are in the normal position as shown in full lines in Figure 1, and the extension 25 then overlies the loop 15 as shown.

It is well known that difficulty is incurred in connecting together the opposite ends of a skid chain on a tire.

Where my device is employed, the opposite ends of the device may be pulled apart causing the compression of the spring 18 and the separation of the loop 15 and hook 16. The stop washer may then be tilted as shown by dotted lines in Figure 1.

It will, of course, be understood that the slot 24 is of proper size to permit such tilting.

When the stop washer is so tilted, the extension 26 engages the end of the hook 16 and the extension 25 engages the loop 15, and then if the spring is allowed to expand a little, the device will be locked in extended position.

The hook 17 may then be engaged in another link of a skid chain and if the spring is again compressed a little the stop washer will automatically drop to non-locking position.

In Figure 8, I have shown my device installed as part of the skid chain on a tire.

It will be obvious that whenever the spring 18 is stretched, it will be pulled away from the hook 17 and any such stretching in the actual use on the car will always occur when the skid chain link is tightly pulled into the hook 17, and whenever this is not true, the spring will serve as a closure member for the hook 17.

It will be understood that one of my devices is assembled on each side of the skid chain. It affords a limited degree of expansion to the side chains.

With such an expansion device, there is less strain on the skid chains and also less likelihood of their tearing the tire casing.

Some changes may be made in the construction and arrangement of my improved device and it is my intention to cover by my claims, any modified forms of structure and use of mechanical equivalents, which may be reasonably included within their scope.

I claim as my invention:

1. In a device of the class described, a pair of members comprising wire elements bent double, each having a loop at one end slidably receiving the other, and having a hook at its other end, a coil spring on said members between the loops, the spring serving as an adjustable closure for one hook, and a stop washer loosely mounted on one of said members between the other hook and the adjacent loop, having at opposite edges, oppositely projecting members.

2. In a device of the class described, a pair of members comprising wire elements bent double, each having a loop at one end slidably receiving the other, and having a hook at its other end, a coil spring on said members between the loops, the spring serving as an adjustable closure for one hook, and a link having a headed shank received in the other hook, provided with a bendable hook eye for engaging said shank.

3. In a device of the class described, a pair of members each bent to form intermediate portions comprised of parallel parts, each member having a loop slidably receiving the parallel portions of the other member, one of said members having an engaging element at one end opposite its loop and the other of said members having a hook at its end opposite its loop and at the opposite end of said device from said engaging element and a coil spring mounted on said member between said loops and with its ends engaging said loops for normally tending to hold the device in position with the members in their farthest overlapping position, each of said loops being arranged to bear against an end of the spring for the substantial part of the circle, the loop on one of said members serving as an adjustable closure for the hook on the other member.

4. In a device of the class described a pair of members having intermediate parallel adjacent portions with stop elements at their ends, a coil spring receiving said parallel portions between said stop elements, an engaging element on the end of one of said members and a hook on the other member at the opposite end of the device and a stop washer loosely mounted on one of said members between said engaging element and the loop on the other member having at its opposite edges oppositely projecting portions.

5. In a device of the class described, a pair of members each bent to form intermediate portions comprised of parallel parts, each member having a loop slidably receiving the parallel portions of the other member, one of said members having an engaging element at one end opposite its loop and the other of said members having a hook at its end opposite its loop and at the opposite end of said device from said engaging element and a coil spring mounted on said member between said loops and with its ends engaging said loops for normally tending to hold the device in position with the members in their farthest overlapping position, each of said loops being arranged to bear against an end of the spring for the substantial part of the circle and a stop washer loosely mounted on one of said members between said engaging element and the loop on the other member having at its opposite edges oppositely projecting portions.

6. In a device of the class described a pair of members having intermediate parallel adjacent portions with stop elements at their ends, a coil spring receiving said parallel portions between said stop elements, an engaging element on the end of one of said members and a hook on the other member at the opposite end of the device, a link connected with said engaging element having a headed shank at one end and a bendable hook at the other end for engaging said shank.

DONALD M. BATESON.